Feb. 21, 1928.
W. H. SCHULZE
1,659,787
ILLUMINATED INSTRUMENT MOUNT
Original Filed March 20, 1925
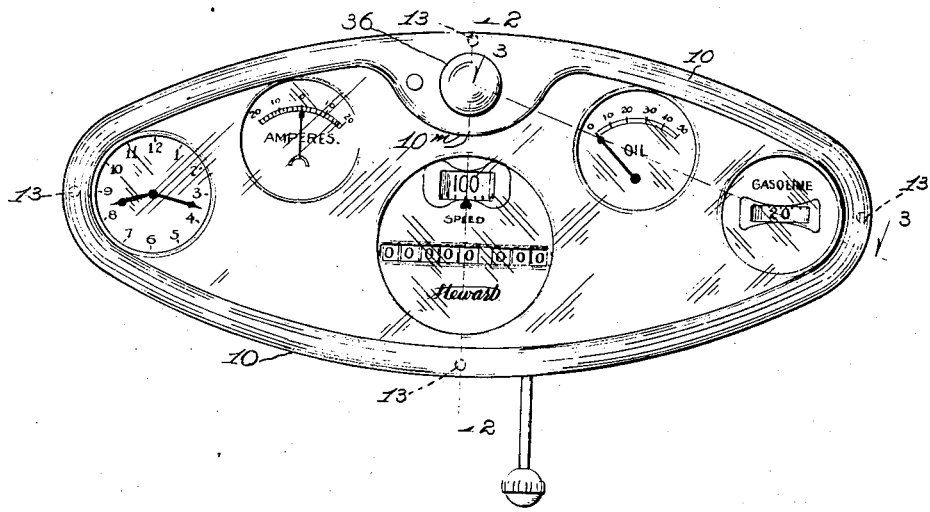
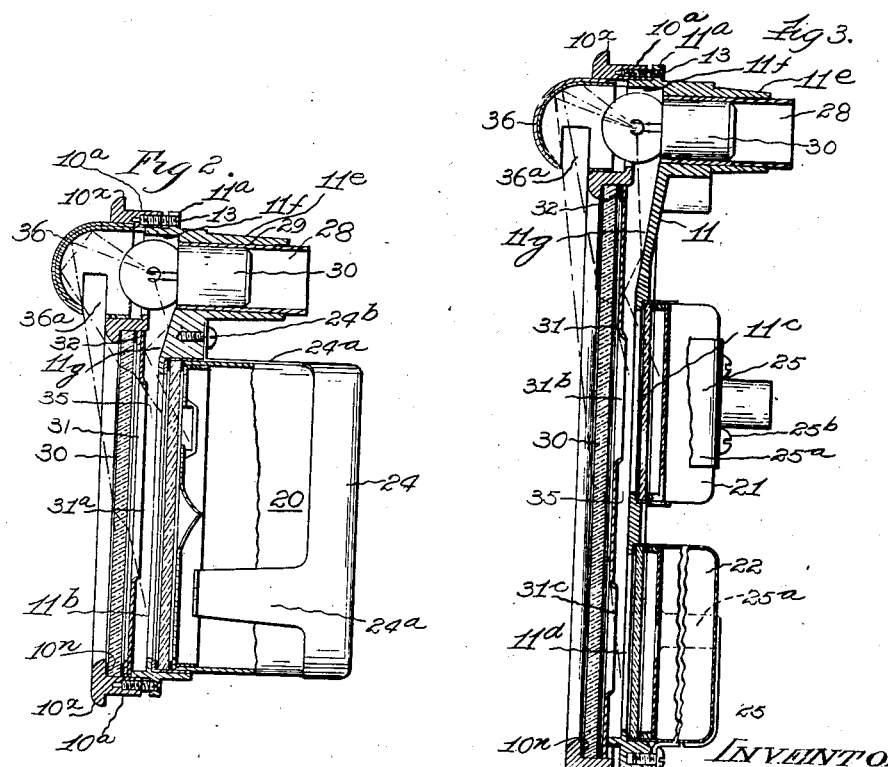
Witness
H. C. McKnight
INVENTOR.
William H. Schulze
By Burton Burton
his ATTORNEYS.

Patented Feb. 21, 1928.

1,659,787

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

ILLUMINATED INSTRUMENT MOUNT.

Application filed March 20, 1925, Serial No. 17,011. Renewed July 7, 1927.

The purpose of this invention is to provide an improved construction of an instrument mount particularly designed for carrying a plurality of instruments upon a motor vehicle provided with means for illuminating the reading faces of the several instruments. It consists in the elements and features of construction shown and described in the claims.
In the drawings:—

Figure 1 is a front elevation of an instrument mount having instruments mounted therein and embodying this invention for illuminating the instruments.
Figure 2 is a section at the line 2—2 on Figure 1.

Figure 3 is a section at the line 3—3 on Figure 1.

The instrument mount shown in the drawings comprises a forward marginal frame member, 10, and a rear frame member, 11, which are adapted to be secured together by screws distributed at convenient intervals around the periphery, instances being seen at 13, 13, on Figures 2 and 3 respectively, said screws taking through lugs, 11ª, projecting from the periphery of the rear member, 11, and screwed into the rearwardly projecting peripheral body, 10ª, of the member,
10. The member, 11, is provided with apertures for accommodating the instruments to be served and through which the reading faces of the instruments may be visible from the forward side, said apertures comprising the aperture, 11ᵇ, for the combined speedometer and odometer, 20, the aperture, 11ᶜ, for accommodating the lubricant supply indicator and the aperture, 11ᵈ, for the gasoline depth gauge, and apertures, not shown, corresponding to 11ᶜ and 11ᵈ for the clock and ammeter shown in Figure 1. These instruments are presumed to be each complete in itself and adapted to be entered and fitted in the apertures mentioned provided for them in the mount member, 11, and retained securely in connection with the mount by any convenient means according to the form of the instrument cases, as, by a retaining member, 24, fitted to pass over the rear of the case of the instrument, 20, and having lugs, 24ª, for securement by the screws, 24ᵇ, to the back side of the mount member, 11; or by retaining brackets such as shown at 25 in connection with the instruments, 21 and 22, in Figure 3, spanning the rear of said instruments and having lugs, 25ª, for engagement of screws, 25ᵇ, for attaching to the rear side of the mount member, 11. The particular means and mode of holding the instrument to the mount member, 11, does not constitute an essential part of this invention, and any suitable means for that purpose may be employed without departure from this invention.

The mount member, 11, is formed with a peripheral forwardly projecting flange, 11ᶠ, extending entirely around the margin of said member and exteriorly dimensioned for fitting inside of the marginal rearwardly projecting flange, 10ª, of the forward mount member, 10. The forward face of said rear member, 11, within said peripheral flange, 11ᶠ, is recessed or cut back at the upper side of said area, forming a slope seen at 11ᵍ in Figures 2 and 3; and said mount member, 11, is provided at the upper side at about the middle point longitudinally of said member and of said slope, 11ᵍ, with a rearwardly projecting hollow boss, 11ᵉ, for accommodating a lamp socket indicated at 28 as fitted within a bushing, 29, in the cavity of said hollow boss and carrying a lamp indicated at 30. The cavity of the hollow boss thus opens at its forward end directly from the foot or most recessed point of the slope, 11ᵍ, so that the illuminating zone of the lamp bulb in the socket in said hollow boss is positioned in the plane or zone of the forward recess or cavity within the encompassing marginal flange, 11ᶠ, of the said rear mount member, 11. The front mount member, 10, has at the upper side midway in its length, a protrusion, 10ᵐ, into the otherwise substantially oval opening in said mount member, said protrusion depending in front of the hollow boss, 11ᵉ, of the rear mount member, 11. Said forward mount member is rabbeted at the rear side around the entire interior margin as seen at the resulting shoulder, 10ⁿ, for forming the peripheral flange, 10ª, and in this rabbet there are lodged first a glass-in-common, 30, extending over all the instruments carried by the mount, and behind this glass a face plate-in-common, 31, spaced from the glass by a cushioning gasket, 32, said face plate-in-common having apertures, as 31ª, 31ᵇ and 31ᶜ, positioned for registering with the reading faces of the several instruments mounted in the rear member, 11, behind said apertures respectively. When the two members, 10 and 11, are secured together as described, it will be seen that there is formed an inter-space, 35, between the forward surface of the rear member, 11, within the marginal flange by which it is clamped by the screws, 13, to the forward member, and the rear surface of the face plate-in-common, 31, which inter-space opens into the hollow boss in which the lamp is carried, in the plane of the illuminating zone of the lamp; and that the recess which produces the slope, 11$^e$, in said forward end of the cavity of the hollow boss, and thereby from the lamp, to said inter-space, 35, whereby the light from the lamp may reach and penetrate and be diffused through the said inter-space in all directions so as to illuminate the reading faces of all the instruments.

The protrusion, 10$^m$, overhanging or standing in front of the forward end of the hollow boss which accommodates the lamp, is apertured co-axially with said hollow boss for accommodating a reflector hood, 36, which is inserted from the forward side in said hollow boss, said hood having a lateral aperture 36$^a$, positioned in the zone forward of the forward or outer surface of the marginal bead, 10$^x$, of the mount member, 10, said aperture extending around somewhat more than 180 degrees of the circular extent of the hood. This reflector hood is curved as to its interior surface for reflecting light from the lamp out through the aperture, 36$^a$, and the aperture is dimensioned with respect to the curvature of the reflecting surface of the hood, so that the rays of light thus reflected may reach and illuminate the entire outer surface of the glass-in-common and may strike the glass at such angles that to a large extent they may pass through the glass at the apertures of the face plate-in-common and through said apertures and reach and illuminate the reading faces of the instruments exposed through said face plate-in-common apertures.

I claim:—

1. An instrument mount for a motor vehicle and the like comprising an encompassing marginal front frame and a back frame member adapted to be secured together, the back frame member having near one lateral margin a rearwardly protruding hollow boss for mounting a lamp socket, and the front frame having a protrusion in its plane from the inner margin, with an aperture registering with the cavity of the back frame boss; a lamp socket mounted in the back frame member boss, and a reflector hood mounted in the front frame aperture, the back frame member having apertures for accommodating registering instruments with their reading faces exposed at said apertures; a face plate-in-common over all the instruments occupying the entire area of the front frame opening and spaced away from the face of the back frame which has the instrument accommodating apertures, and a glass-in-common covering said face plate-in-common, the face plate and the glass being both mounted in the front frame, the back frame having an aperture at the inner side of the hollow boss opening from the cavity of the boss at the forward or upper end thereof above or forward of the inner end of the socket and laterally with respect to the position of a lamp mounted in the socket, for admitting a beam of light substantially in the plane of the inter-space between the instrument faces mounted in the back member, and the face plate-in-common, for diffusion by back and forth reflection between the facing surfaces of the face plate and back frame member, to illuminate the instrument faces.

2. In the construction defined in claim 1, foregoing, the back frame member having its surface facing the face plate-in-common at the area adjacent to the opening into the cavity of the lamp-socket-holding boss sloped back from the general plane of said surface to the entrance to said boss cavity for providing a surface from which light rays shall be reflected at wide angle for impinging on the inner surface of the face plate-in-common for reflection therefrom toward the instrument faces.

3. In the construction defined in claim 1, foregoing, the reflector hood being protruded from the plane of the outer surface of the front marginal frame member, and open through approximately 180 degrees about the axis of the lamp socket at the side inward with respect to the area of the forward frame opening, and being curved for reflecting light from its inner surface to spread broadly over the surface of the glass-in-common and toward the instrument face exposed through said glass.

4. An instrument mount for a motor vehicle and the like comprising an encompassing marginal front frame and a back frame member adapted to be secured together, the back frame member having near one lateral margin a rearwardly protruding hollow boss for mounting a lamp socket and the front frame having a protrusion in its plane from its inner margin with an aperture registering with the cavity of the boss; a lamp socket mounted in the boss of the rear frame member, and a reflector hood mounted in the front frame member, said hood being protruded from the plane of the outer surface of the front marginal frame member and open for approximately 180 degrees about the axis of the lamp socket at the side inward with respect to the area of the forward frame opening, the back frame having apertures for accommodating registering instruments with their reading faces exposed at said apertures, a glass-in-common mounted in the front frame covering the exposed faces of all the instruments, the reflector hood being curved for reflecting light from its inner surface to spread broadly over the surfaces of said glass-in-common and toward the instrument faces exposed through said glass.

In testimony whereof, I have hereunto set my hand this 16 day of March, 1925.

WILLIAM H. SCHULZE.